United States Patent
Lovett

(10) Patent No.: US 6,295,944 B1
(45) Date of Patent: Oct. 2, 2001

(54) AUTOMATIC TETHERING SYSTEM FOR A FLOATING DOCK

(76) Inventor: J Timothy Lovett, 387 Blue Springs Rd., Fayetteville, AR (US) 72703

( * ) Notice: Subject to any disclaimer, the term of this patent is extended or adjusted under 35 U.S.C. 154(b) by 0 days.

(21) Appl. No.: 09/597,211

(22) Filed: Jun. 20, 2000

(51) Int. Cl.[7] .................................................. B63B 35/44
(52) U.S. Cl. ................ 114/263; 114/230.23; 114/230.27
(58) Field of Search ............................... 114/263, 230.23, 114/230.27; 405/219, 221

(56) References Cited

U.S. PATENT DOCUMENTS

| | | |
|---|---|---|
| 2,952,236 * | 9/1960 | Moyes . |
| 3,050,947 * | 8/1962 | Burton . |
| 3,088,287 * | 5/1963 | Berry . |
| 3,683,838 * | 8/1972 | Godbersen . |

* cited by examiner

Primary Examiner—Sherman Basinger

(57) ABSTRACT

A tethering system for a floating boat dock that allows both vertical and horizontal motion of the dock in response to changes in water level while maintaining the dock in a constant position relative to the moving shoreline. The system comprises cables attached to earth anchors, maintained under constant tension and mechanically coupled to rolling ground contact elements that bear against the bottom of the body of water.

1 Claim, 1 Drawing Sheet

AUTOMATIC TETHERING SYSTEM FOR A FLOATING DOCK

U.S. PATENTS REVIEWED

| | | | |
|---|---|---|---|
| 3952684 | April, 1976 | Ferguson | 114/230.2 |
| 4028899 | June, 1977 | Carmichael | 61/48 |
| 4399959 | august, 1983 | Godsoe | 242/195 |
| 4656961 | April, 1987 | Hellkamp | 114/230 |
| 4926776 | May, 1990 | Corbett | 114/263 |
| 5341757 | August, 1994 | Digiacomo | 114/230 |
| 5657832 | August, 1997 | Stevens | 182/1 |
| 4488501 | December, 1984 | Kratt | 114/230 |
| 4493283 | January, 1985 | Elliott | 114/263 |
| 5165823 | November, 1992 | Cupples | 405/219 |
| 5173067 | December, 1992 | Biba | 441/26 |
| 5265553 | November, 1993 | Brydges | 114/230 |
| 5282435 | February, 1994 | Chapman | 114/263 |
| 5819679 | October,1998 | Bonate | 114/230 |
| 5944451 | August, 1999 | Martin | 405/218 |

FIELD OF THE INVENTION

The invention relates to floating boat docks and the means of securing these docks against the action of wind and waves and of maintaining these docks at more or less constant positions relative to a moving shoreline resulting from changes in water level.

BACKGROUND OF THE INVENTION

Floating boat docks are a very popular means of providing access to boats. In many reservoirs, the water level can vary drastically, changing by as much as 25 ft. In these cases, a fixed boat dock is not practical and a floating boat dock is the only option.

Most floating docks are accessed by means of a bridge or floating walkway. The bridge or floating walkway is typically of a fixed length, say 30 ft. Thus, it is desirable to maintain the floating dock at a fixed distance from the moving shoreline so that the end of the bridge is supported by and accessible from dry land. This requires that the dock move both horizontally and vertically in response to changes in water level. For a reservoir or lake with a bottom grade of 25%, a water level change of 25 ft. would require that the dock move 25 ft. in the vertical direction and 100 ft. in the horizontal direction in order to maintain a constant distance from the shoreline.

Floating boat docks are typically held in place against a shoreline by means of cables and stand-offs. The cables are attached to earth anchors and wound onto take-up winches on the dock. The earth anchors are embedded in the earth above the high water level. The stand-offs are rigid, adjustable legs, typically of structural steel, extending from the dock in the direction of the shore. Cable is taken up onto the winches until the stand-offs are brought into contact with the shore or the bottom of the body of water. In this position, the stand-offs prevent the dock from moving toward the shore and the cables prevent the dock from moving away from the shore. The cables provide tensile elements while the stand-offs provide the balancing compression elements.

This system functions well for maintaining the dock in a constant position relative to the shoreline as long as water level remains constant. When water level changes, however, the dock must be manually adjusted. When water level falls, the stand-offs must be raised, cable must be paid out, the stand-offs must be reset and the cables retensioned. When water level rises, the cables must be taken in until the stand-offs are again in contact with the shore or bottom. Failure to make the adjustments or to make them in a timely manner will result in the floating dock grounding out, i.e. coming to rest on the lake floor, which is damaging to the floatation elements, or developing slack in its mooring cables, which can permit it to swing into other docks, boats or obstacles.

The prior art includes a system for mooring a floating boat dock utilizing cables under constant tension. (U.S. Pat. No. 5,944,451) This system utilizes cables attached to the floor of the body of water beneath the floating dock and taken up or paid out by constant torque reels mounted under the dock. There is no stand-off or any compression element. This system serves to adjust the floating dock vertically in response to changes in water level. Horizontal motion, however, is prevented by the multiple, downward cables. Indeed, it is stated as an objective of the invention to maintain the dock in its original horizontal position.

The prior art also includes a means of addressing the required horizontal motion of a floating dock. (U.S. Pat. No. 5,282,435) This system utilizes a cable anchored both on the shore above the high water level and to the floor of the body of water below the low water level. The portion of the cable extending from the dock into the water can, however, pose a hazard to boaters, swimmers, divers, etc. In addition, the ratchet mechanism included to serve as an adjustable stand-off, which must operate in a hostile environment, may present reliability problems due to parts that must move through a wide range of motion and may become mired in the floor of the body of water.

There is a need for a floating boat dock tethering system that would accommodate both vertical and horizontal motion without manual adjustment of cable tension and stand-off position. It is the object of this invention to provide a means of securing a floating boat dock to the shore of a body of water that will automatically and reliably accommodate both vertical and horizontal motion of the dock to maintain the position of the boat dock relative to the moving shoreline, requiring no intervention of the dock owner or operator, utilizing cable attachments to the shore only.

SUMMARY OF THE INVENTION

The present invention comprises a means of securing a floating boat dock against the action of wind, waves, etc, and of maintaining the floating dock at a more or less constant position relative to the shoreline. Changes in water level produce changes in the location of the shoreline that can cause a floating dock to ground out, a condition in which the dock comes to rest on the floatation elements, or to float freely and possible collide with other docks, boats, etc. It is the goal of the present invention to maintain a floating dock at a more or less constant position and orientation relative to a shoreline without the requirement that the dock owner or operator make adjustments to either the cables that prevent the dock from drifting away from the shore or to stand-offs that prevent the dock from moving too close to shore. Furthermore, it is desired to accomplish these goals reliably and safely, without posing a risk of injury to those around the invention.

The present invention accomplishes these goals by coupling constant force springs to a cable take-up spool and to a rolling ground contact element. Constant force springs are known in the prior art and come in several forms. A commercially available type from Hunter Spring Co. called the Negator takes the form of a thin metal strip, preformed to wrap around a spool. When forced to wrap around a second spool in the opposite direction, a torque is exerted on both spools to rewind the strip in its preferred direction. This provides a constant torque throughout a large range of motion. These springs can be manufactured to provide desired combinations of force and stroke. They can also be combined to provide greater force than could be developed by a single spring.

The rolling ground contact element remains in contact with the floor of the body of water and prevents the cable tension from pulling the dock too close to shore, where floatation elements could contact the bottom or there may not be adequate water depth for boats to approach the dock. The rolling ground contact elements are mechanically coupled to the cable take-up system such that rotation of the take-up spool must be accompanied by rotation of the rolling ground contact element and vice versa. The sense of the connection is such that rotation of the take-up spool to pay out cable is accompanied by rotation of the ground contact element to promote movement of the dock away from the shoreline. Conversely, rotation of the take-up spool to take in cable is accompanied by rotation of the ground contact element to promote movement of the dock closer to the shore.

DESCRIPTION OF THE INVENTION

Figure 1:
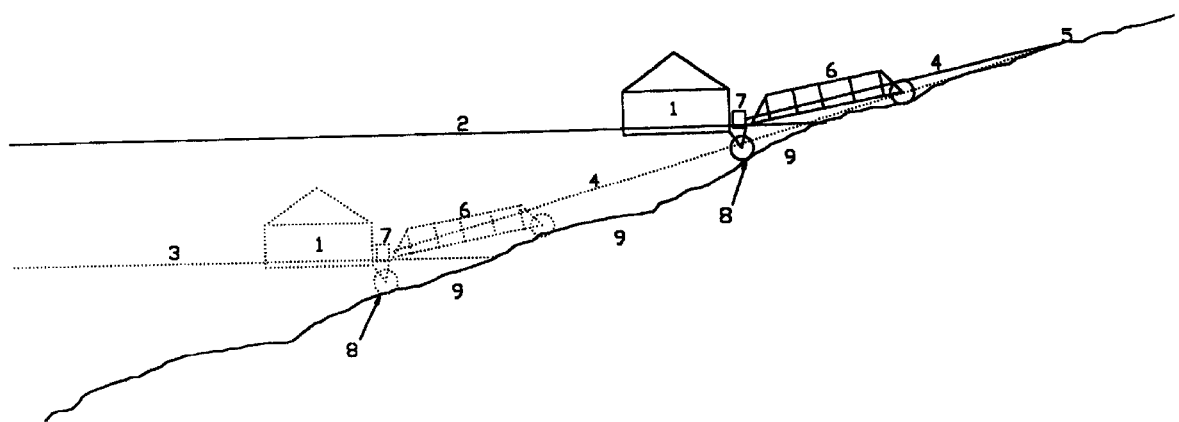
FIG. 1 illustrates required motion of a floating dock as it travels between a high water level and a low water level.

FIG. 1 illustrates required motion of a floating dock (1) as it travels between a high water level (2) and a low water level (3). This motion includes both horizontal and vertical displacement. The dock is attached to land by a cable (4) which is secured to an earth anchor (5). Access to the dock is by means of a bridge (6) that may float on the water surface or rest one end upon land, which end rolls on a wheel. It is the object of this invention to maintain the position of the floating dock relative to the shoreline despite changes in water level, without action by the dock owner or operator. This is accomplished by means of the constant tension maintained on the cable(s) (4) by the constant torque take-up spool mounted in the housing (7) and the rolling ground contact element (8) that is in contact with floor of the body of water (9) and is mechanically coupled to the take-up spool inside the housing (7).

Figure 2:
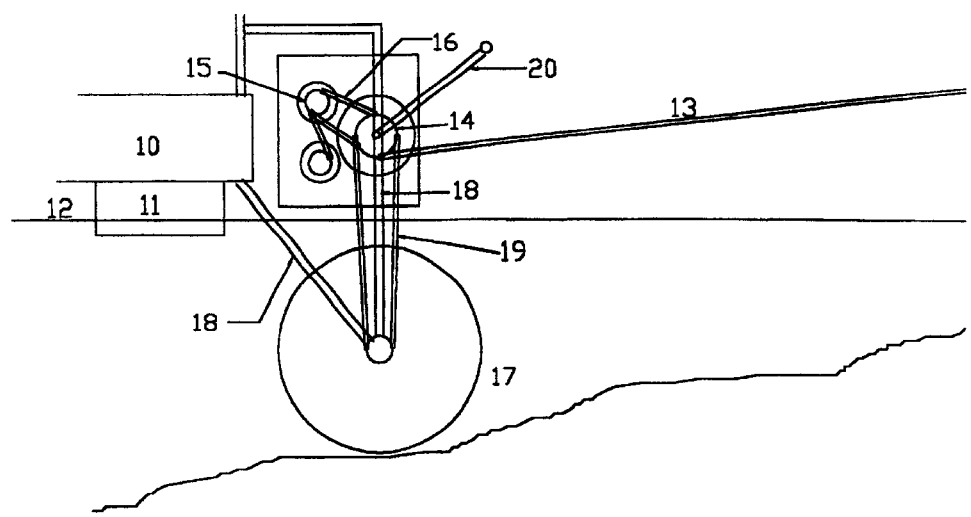
FIG. 2 illustrates an embodiment of the invention.

FIG. 2 illustrates one embodiment of this invention. The floating dock (10) is supported by its floatation elements (11) on a water level (12). The dock is secured to the shore by a cable(s) (13). The cable is taken up onto or paid out from a spool (14). The cable is maintained under a more or less constant tension by means of a constant force spring (15) mechanically coupled to the take-up spool (14) by a belt, chain, or other suitable means (16). Alternatively, the springs could be mounted on the same shaft as the take-up spool with both spring spools and take-up spool rotationally connected to the shaft or connected to each other. There are many possible arrangements by which constant force springs can be mechanically coupled to a take-up spool to produce constant tension in a cable. Also, multiple springs can be used to provide greater force if required.

A rolling ground contact element (17) bears against the floor of the body of water, which exerts a force against it, whose horizontal component balances the horizontal component of cable tension. The ground contact element (17) is supported by suitable structural elements (18) and is mechanically coupled to the take-up spool (14) by a belt, chain or other suitable means (19). An alternative embodiment would rotate the take-up spool such that its axis of rotation would be vertical and it could be rotationally connected to the roiling ground contact element by means of a shaft fitted with a pair of bevel gears. Similarly, the ground contact element could as easily be rotationally connected to either of the constant force spring spools as to the take-up spool, since all are ultimately rotationally connected.

The present invention comprises two major interconnected sub-systems. The first is a number of cables attached to earth anchors on the one end, and wound onto take-up spools on the other end. The take-up spools are attached to constant force springs such that the springs apply a constant torque on the take-up spools. This produces a constant tension in the cable. Constant force springs are well know and are combined with spools for take-up and pay out purposes in the prior art.

The second major element is the rolling ground contact element. The rolling ground contact element serves as the compression element, and maintains the dock at the correct stand-off distance from the shoreline. If the dock is allowed to move too close to the shoreline, the floatation elements may contact the floor of the body of water and be damaged and the water depth may not be sufficient for boats to approach the dock. The rolling ground contact element serves the same purpose as a stand-off with several important distinctions. The first is that the rolling ground contact element contains wheels or tracks that permit them to remain in constant contact with the floor of the body of water. There is no need to raise or lower it (or them) and it can move with the dock without becoming stuck in the bottom of the body of water. The second is that the wheel or track is mechanically coupled to the take-up spools, by a chain, a belt, a shaft with bevel gears or other suitable means, such that motion of the wheel must accompany motion of the take-up spool and vice versa.

The mechanical coupling of the ground contact element with the take-up spools serves three important ends. First, the force imparted against the wheel by the floor of the body of water in response to a decrease in water level acts to assist the take-up spools to pay out cable. When water level falls, the shoreward side of the dock will tend to be increasingly supported by the ground contact element, rather than the floatation elements. This will increase the contact force between the wheel and the floor of the body of water, and, if there is any slope to the floor, impart a torque to the wheel. That is, the wheel will tend to roll downhill. Since the wheel is mechanically connected to the take up spool, the torque imparted to the wheel as it rolls downhill will act to decrease the tension in the cable, which will serve to assist in overcoming friction and inertia and cause cable to be paid out. Thus the dock will move away from the shoreline to a new equilibrium position, at the correct distance from the shoreline.

When water level rises, the dock will float up, decreasing the contact force between the wheel and the floor of the body of water. Cable tension will apply a torque to the wheel to cause it to turn in the correct direction to roll up the slope of the floor of the body of water. The combination of the cable tension and the torque on the wheel will result in the dock moving shoreward until the horizontal component of the wheel contact force increases sufficiently to balance the horizontal component of cable tension.

The second purpose of the ground contact element being mechanically coupled to the take-up spools is safety. In the event that a cable break occurs, the constant force springs will cause a sudden and violent retraction of the cable attached to it. This can pose a significant safety hazard to personnel in the area. By mechanically attaching the take-up spools to the ground contact wheels this hazard is avoided. Assuming the wheels are in contact with the floor of the body of water at the time of the cable failure, the side of the dock with the failed cable would begin to drift off-shore. This would bring the wheel out of contact with the floor and the wheel would begin to turn as the spool takes up cable. The take-up spool can never retract cable any faster than the wheel can be turned, however, so the energy stored in the constant force spring would be harmlessly dissipated in spinning the wheel against the resistance of the water rather than used to accelerate the cable to dangerous speeds.

The third purpose for coupling the ground contact element and the take-up reel is to provide a positive means of manually adjusting the dock position, should that be necessary. In the event that the wheel comes to rest on a flat spot on the floor of the body of water, falling water level would increase the contact force between the wheel and the floor, but it would not produce a torque tending to turn the wheel. Or, the wheel could become mired in a soft bottom. In these cases, a hand crank (20), can be inserted into a socket provided for the purpose, in the flange of the take-up spool; for example. By manually turning the hand crank, torque will be applied to the wheel to cause it to move away from the shore, while simultaneously, the correct amount of cable will be paid out.

The combination of the constant force cable take-up spools with the fixed ground contact elements with rolling members mechanically coupled to the take-up spools produces a system that will automatically maintain a floating boat dock in the correct position relative to the shoreline despite significant changes in water level, with no adjustment or interaction required from the dock owners, users or managers. The use of attachment cables on land only eliminate the hazard to swimmers, boaters, etc. posed by submerged cables and the use of rolling elements coupled by chains and sprockets, toothed rubber belts, geared shafts or the like, provide a highly reliable means of maintaining stand-off distance.

I claim:

1. A device for maintaining a floating dock at a more or less constant position and orientation relative to a shoreline of a body of water despite changes in the water level of the body of water, said device comprising:

(a.) at least one cable take-up spool, said at least one cable take-up spool being wound with cable, said cable being secured at one end to at least one earth anchor, said at least one cable take-up spool being rotationally coupled to at least one constant force spring so as to maintain a constant cable tension;

(b.) at least one rolling ground contact element, said at least one rolling ground contact element bearing against the bottom of the body of water and preventing the dockfrom moving too far toward the shoreline;

(c.) said at least one rolling ground contact element being rotationally coupled with said at least one cable take-up spool such that rotation of said at least one ground contact element is coordinated with rotation of said at least one cable take-up spool to promote movement of the dock toward or away from the shoreline; and (d.) means for manually applying torque to said at least one rolling ground contact element to cause the dock to either move away from the shoreline while simultaneously paying out said cable, or to move toward the shoreline while taking up said cable.

* * * * *